KIMBALL & RICE.
Car-Brake Shoe.
No. 6,988.
Patented Jan. 1, 1850.
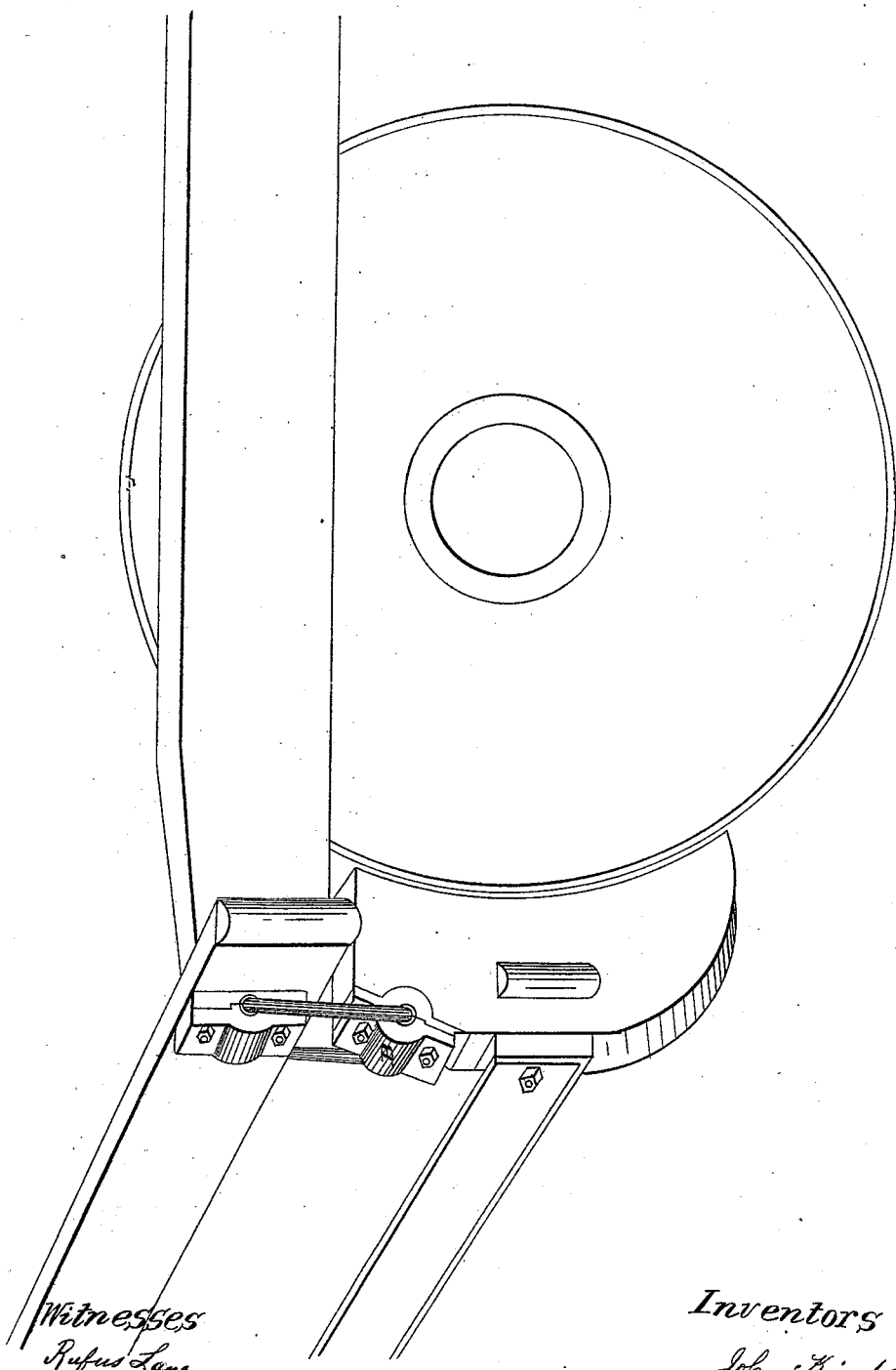

UNITED STATES PATENT OFFICE.

JOHN KIMBALL AND HARVEY RICE, OF CONCORD, NEW HAMPSHIRE.

IMPROVEMENT IN CONNECTIONS OF BRAKES WITH CARS.

Specification forming part of Letters Patent No. 6,988, dated January 1, 1850.

*To all whom it may concern:*

Be it known that we, JOHN KIMBALL and HARVEY RICE, both of Concord, in the county of Merrimac and State of New Hampshire, have invented a new and Improved Mode of Hanging Brakes to Passenger and other Railroad-Cars, and Suspending or Connecting other Similar Machinery; and we do hereby declare that the following is a full and exact description of the same.

This invention consists in placing a tube, coating, or lining of india-rubber or other elastic substance around a link or pin passing through a box or casing which contains the brake or other portion of machinery and inclosing and confining such rubber or other substance by such box or casing, so as to hold the rubber in a permanent position, except so far as its elasticity is affected by the pressure or motion of the link or pin whenever the brake or other portion of machinery is used, thereby causing the rubber to act and react within itself without any rubbing or friction of the link or pin in which it is inclosed, thus avoiding all wear of these portions of machinery and all rattling and noise and obviating the objection arising from attaching or connecting the brakes or other similar machinery in the mode now in use by an iron hinge or links suspended on pins in wood, iron, or other metal and constantly wearing them so that they become weak and hazardous and require to be replaced and make a continual rattling and noise; also, constructing such brake or other portion of machinery with a second box or casing inclosing the other end of the link, one end of which box is secured by a bolt or bolts to the brake or other machinery, as shown in the drawing at letter B, thereby forming a double joint to the brake and enabling the brake to be applied so as to adapt itself to the wheel at all times with the same force through the whole arc of the brake and not more at the top of the brake than at the bottom, as is the case with brakes without such joint, and without any difference whether the springs of the truck-frame are more or less depressed. This joint may be coated like the first, and thereby enable it to operate without wear or noise.

What we claim as our invention is—

The inclosure of said link or pin in a tube, coating, or lining of india-rubber or other elastic substance and securing said rubber in a box or casing, so as to confine the same permanently in such way as to allow the action of the brake or other machinery without wear or friction, rattling, or noise.

JOHN KIMBALL.
HARVEY RICE.

Witnesses:
 N. G. UPHAM,
 Z. S. PACKARD.